US007663098B2

(12) United States Patent
Seto et al.

(10) Patent No.: US 7,663,098 B2
(45) Date of Patent: Feb. 16, 2010

(54) GAS MONITORING APPARATUS AND GAS MONITORING METHOD

(75) Inventors: Yasuo Seto, Kashiwa (JP); Isaac Ohsawa, Kashiwa (JP); Hiroshi Sekiguchi, Tokyo (JP); Hisashi Maruko, Tokyo (JP); Yasuaki Takada, Kiyose (JP); Akihiko Okumura, Hachioji (JP); Hidehiro Okada, Tokyo (JP); Hisashi Nagano, Higashimurayama (JP); Izumi Waki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 309 days.

(21) Appl. No.: 11/704,351

(22) Filed: Feb. 9, 2007

(65) Prior Publication Data

US 2008/0054172 A1 Mar. 6, 2008

(30) Foreign Application Priority Data

Sep. 1, 2006 (JP) ............................ 2006-237892

(51) Int. Cl.
*H01J 49/00* (2006.01)
*G01N 1/22* (2006.01)

(52) U.S. Cl. ...................... 250/282; 250/281; 250/288; 702/23; 436/173

(58) Field of Classification Search ................. 250/281, 250/282, 286, 287, 288, 289; 436/173; 702/23, 702/27, 28, 32
See application file for complete search history.

(56) References Cited

U.S. PATENT DOCUMENTS 6,435,003 B1 * 8/2002 Warburton .................. 73/23.2
2002/0048818 A1 * 4/2002 Sakairi et al. ............... 436/126
2004/0113063 A1 * 6/2004 Davis ......................... 250/282
2005/0247871 A1 * 11/2005 Bryden et al. ............... 250/288
2007/0141630 A1 * 6/2007 Gadek et al. ................. 435/7.1

FOREIGN PATENT DOCUMENTS

JP 2000-162189 6/2000
JP 2004-158296 6/2004
JP 2004-286648 10/2004
JP 2005-274565 10/2005

OTHER PUBLICATIONS

Mesilaakso et al., "Indentification of Compounds through Reference to Simulated Data", 1997, Applied Spectroscopy vol. 51(5), pp. 733-737.*
Kim et al., "A Rapid and Sensitive Analysis of DA in Water by Gas Chromatography/Mass Spectrometry", 2005, Analytical Sciences vol. 21, pp. 513-516.*

* cited by examiner

*Primary Examiner*—Jack I Berman
*Assistant Examiner*—Nicole Ippolito Rausch
(74) *Attorney, Agent, or Firm*—Antonelli, Terry, Stout & Kraus, LLP.

(57) ABSTRACT

A gas monitoring apparatus capable of real-time detection of a kind of chemical warfare agent, namely diphenylcyanoarsine (DC) and/or diphenylchloroarsine (DA). Atmospheric pressure chemical ionization mass spectrometry is carried out in the positive ionization mode, the total amount of DC and DA is determined from the intensity of an ion common to DC and DA, the DC concentration is determined from the intensity of an ion specific to DC, and the difference between them is regarded as the DA concentration.

7 Claims, 11 Drawing Sheets

| NAME OF CHEMICALS (101) | SENSITIVITY COUNTS (μg/m³) (m/z=229) (102) | SENSITIVITY COUNTS (μg/m³) (m/z=256) (103) | SENSITIVITY COUNTS (μg/m³) (m/z=265) (104) |
|---|---|---|---|
| DC | | | |
| DA | | | |

GAS MONITORING APPARATUS AND GAS MONITORING METHOD

CLAIM OF PRIORITY

The present application claims priority from Japanese application JP 2006-237892 filed on Sep. 1, 2006, the content of which is hereby incorporated by reference into this application.

FIELD OF THE INVENTION

The present invention belongs to the field of mass spectrometry technology and, more particularly, relates to a gas monitoring apparatus for measuring the concentration(s) of a chemical warfare agent(s) in the atmosphere using a mass spectrometer and displaying the same.

BACKGROUND OF THE INVENTION

The threat of terrorism is increasing all over the world. As for chemical terrorism using a chemical warfare agent (hereinafter referred to as "chemical agent"), in particular, the production of such a chemical agent is easier when compared with production of nuclear weapons and, once really committed, it caused a serious damage, so that every country is taking strict precautions against it. In Japan, too, a chemical agent was misused in the Matsumoto and Subway sarin gas incidents, among others, and it is urgent that measures be taken against chemical agents. Further, it has become evident that chemical weapons estimably produced by the old Japanese army during the wartime are buried in China and in Japan; reportedly, if chemical agents are allowed to leak out into the environment during construction work, for instance, it caused health damages in some instances. It is required that abandoned chemical weapons and chemical agents retained therein be dug up, recovered and rendered harmless safely and promptly.

In case of actual use or leakage of a chemical agent, it is necessary to immediately know the chemical agent species and the concentration thereof in the atmosphere and utilize the information obtained in inhabitant evacuation, treatment and decontamination. Therefore, a chemical agent detector utilizing the technology of mass spectrometric analysis, which is known as a method excellent in speed, sensitivity and selectivity among various analytical methods, has been proposed (JP 2004-158296 A and JP 2004-286648 A). Referring to FIG. 11, the prior art chemical agent detector utilizing the technique of atmospheric pressure chemical ionization mass spectrometry is described. The chemical agent detector is constituted of a sample introduction section 1, an ionization section 2, a mass spectrometry section 3, a control section 4, a suction pump 5, a computer 6 for measurement and processing and a vacuum pump 7. A sample 16 introduced into the sample introduction section 1 is heated and vaporized. The sample, now gaseous, is led to the ionization section 2 by means of the suction pump 5. The sample introduced into the ionization section 2 is sent to and ionized in a corona discharge region. The ions formed are led to the mass spectrometry section 3 for mass spectrometric analysis. The results of the mass analysis are processed by the measurement/processing computer 6 for displaying. When the results obtained show the characteristic features of the results of measurement of a chemical agent, the chemical agent is regarded as having been detected.

As a gas monitoring apparatus which utilizes atmospheric pressure chemical ionization mass spectrometry, an exhaust gas monitoring apparatus is disclosed in JP 2000-162189 A. In this apparatus, an exhaust gas is taken into an atmospheric pressure chemical ionization mass spectrometer and the concentration of dioxin and related compounds contained in the exhaust gas is displayed. JP 2005-274566 A describes that lewisite, diphenylcyanoarsine and/or diphenylchloroarsine is subjected to derivatization treatment and then analyzed by a gas analyzer.

SUMMARY OF THE INVENTION

Detailed investigations have so far been made concerning the methods of analyzing and detecting lethal chemical agents such as sarin. On the other hand, diphenylcyanoarsine (hereinafter referred to as DC) and diphenylchloroarsine (hereinafter referred to as DA) developed for suppressing riots and called sneezing agents or emetics have not been produced since the Second World War and, therefore, methods of analyzing or detecting these agents DC and DA have seldom been investigated. However, it is to be worried that, in the treatment of abandoned chemical weapons, health damage and environmental pollution may be caused by those DC and DA produced in the past.

JP 2005-274565 A discloses a technology of analyzing DC and DA which comprises derivatization treatment thereof, followed by analysis using a gas analyzer. However, this method still has two problems in the following points.

The first problem is the detection time problem. The above technology includes the steps of collection, by suction, of a sample gas→derivatization treatment→analysis by a gas chromatograph and, therefore, it seems that scores of minutes is required for obtaining the results. Since, however, once a person is exposed to a chemical agent, the effect thereof is produced in an instant, it is necessary, on the occasion of chemical agent leakage, to issue a warning as soon as possible. Thus, an apparatus which can detect DC and DA simultaneously without needing any complicated procedure has been demanded.

The second problem is the sensitivity problem. Upon derivatization treatment, as in the above technology, DC and DA are converted to one and the same substance. Therefore, the total amount of DC and DA can be determined but a problem remains, namely the respective concentrations of DC and DA cannot be known. While no detailed toxic data for DC and DA are available, the median lethal dose (concentration which is lethal to half of persons exposed to that concentration for 1 minute) of DC is estimated to be 1000-10000 mg-min/$m^3$ and that of DA to be about 15000 mg-min/$m^3$. Thus, DC is considered to be more toxic than DA. Therefore, in case when a worker engaged in abandoned chemical agent treatment should be exposed to DC and/or DA, it is important, in deciding the method of treatment, among others, to know the individual concentrations.

For such reasons as mentioned above, a chemical agent monitoring apparatus by which the respective concentrations of DC and DA can be known without delay has been desired.

The present invention provides a chemical agent monitoring apparatus capable of determining the respective concentrations of DC and DA simultaneously by utilizing the technology of atmospheric pressure chemical ionization mass spectrometry.

More specifically, the gas monitoring apparatus of the invention comprises a gas introduction section for introducing a sample gas, an ion source for ionizing components contained in the sample gas by corona discharge, a mass spectrometer for analyzing the ions formed by the ion source for m/z (value resulting from division of the mass by the valence), an operation section for calculating the concentrations of measurement target substances contained in the sample gas based on the ion intensity data obtained by the mass spectrometer, and a display section for displaying the operation results obtained in the operation section, in which apparatus the sum total concentration of diphenylcyanoarsine and diphenylchloroarsine are calculated from a signal common to diphenylcyanoarsine and diphenylchloroarsine included in the measurement target substances, the concentration of diphenylcyanoarsine is calculated from a signal specific to diphenylcyanoarsine and the concentration of diphenylchloroarsine is calculated from the difference between the sum total concentration and the concentration of diphenylcyanoarsine. On that occasion, the m/z=229 ion intensity signal is preferably used as the signal common to diphenylcyanoarsine and diphenylchloroarsine, and the m/z=256 ion intensity signal as the signal specific to diphenylcyanoarsine.

If a chemical agent leakage accident should occur during abandoned chemical weapon treatment, the exact concentrations of DC and DA can be known in an instant in accordance with the present invention. Therefore, the information about the chemical agent species leaked out and the concentrations thereof, which are important in carrying out evacuation and leading of workers and nearby residents, treatment thereof and decontamination, among others, can be promptly provided. Since the respective concentrations of DC and DA, which differ in toxicity, can be determined, evacuation, treatment, decontamination and like dealing with the aftermath can be carried out appropriately.

DETAILED DESCRIPTION OF THE PREFERRED EMBODIMENTS

Figure 1:
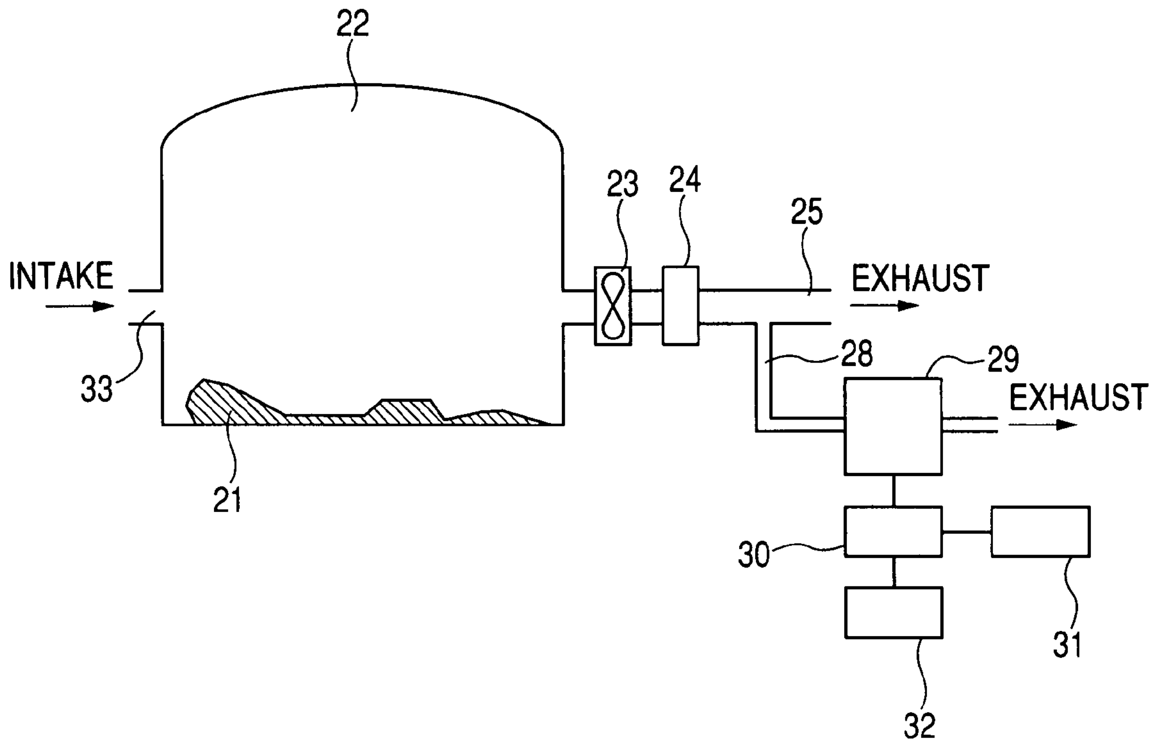
FIG. 1 is a block diagram illustrating the constitution of the whole apparatus necessary for carrying out the invention.

In the following, referring to the drawings, certain modes of embodiment of the present invention are described in detail.

FIG. 1 is a block diagram illustrating the constitution of the whole apparatus necessary for carrying out the invention. As a typical example, the case of monitoring the concentrations of chemical agents released into the atmosphere on the occasion of digging up and recovering an abandoned chemical weapon is described.

On the occasion of digging up and recovering, among others, of an abandoned chemical weapon, there is the risk of contamination of the soil by a chemical agent and, in addition, there is the possibility of an undiscovered chemical weapon, for instance, being contained in the soil and, therefore, careful management is required. Thus, a tent 22 is set up in the vicinity of the digging up/recovering site 21. It is necessary to maintain the inside of the tent 22 at a negative pressure relative to the outside open air so that even when a chemical agent gas is generated within the inside, the gas may be prevented from leaking out of the tent. For that purpose, the air inside the tent 22 is always exhausted by an exhaust fan 23, while the open air is fed to the tent inside through an air inlet 33. The pressure within the tent 22 is determined by the conductance balance between air intake and air exhaustion. The exhaust pipe 25 for exhausting the air in the tent 22 to the outside is provided with a chemical agent removing filter 24 such as an active carbon filter and, thus, even if a chemical agent gas is generated in the process of working inside the tent 22, the leakage of the gas to the outside can be prevented. However, in preparation for a filter trouble, for example filter breakthrough, a part of the gas in the exhaust pipe 25 is branched by an introduction pipeline 28 and introduced into a chemical agent detector 29. The detection signal from the chemical agent detector 29 is sent to a data processor 30. The data processor 30 refers to a database 31 storing chemical agent-derived signals, calculates the chemical agent concentration from the relation between the signal detected by the chemical agent detector 29 and the chemical agent concentration (namely sensitivity), and causes the chemical agent concentration to be displayed in a display section 32.

Figures 11, 12:
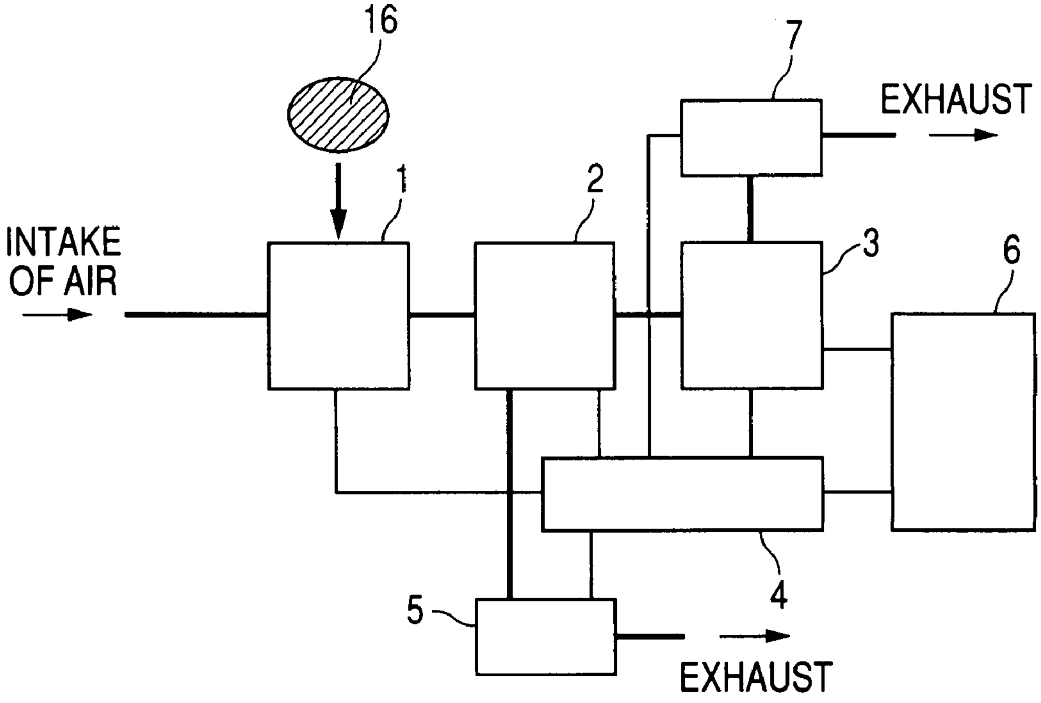
FIG. 11 is a figure schematically illustrating a prior art chemical agent detector.
FIG. 12 is a figure illustrating the contents of a database.
Figure 13:
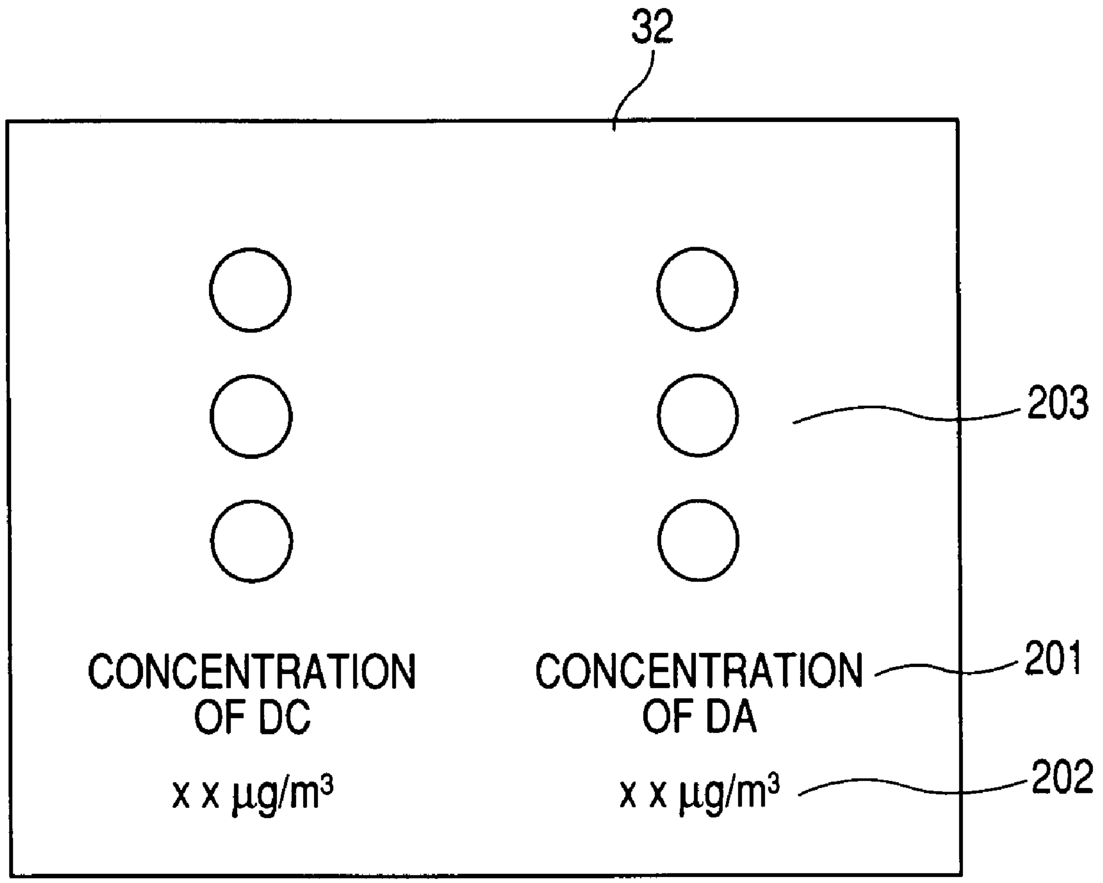
FIG. 13 is a figure showing the display section.

The information stored in the database 31 includes substance names 101, sites of signals appearing on a mass spectrum (m/z) and sensitivities 102, 103 and 104 at respective m/z values, among others, as shown, for example, in FIG. 12. It is recommended that the display section 32 be provided with alarms 203, for instance, for judging the degree of danger with ease in addition to substance names 201 and concentrations thereof 202, as shown in FIG. 13. If color coding is made on the alarm 32, for example if a blue lamp for indicating a level below the control level, a yellow lamp for indicating a level exceeding the control level, or a red lamp for indicating a level greatly exceeding the control level and needing emergent worker evacuation is lighted according to the situation, the situation can be recognized with ease. It is further recommended that such functions as sounding an alarm or/and notifying an administrator about the danger through wire or by radio be provided.

Figure 2:
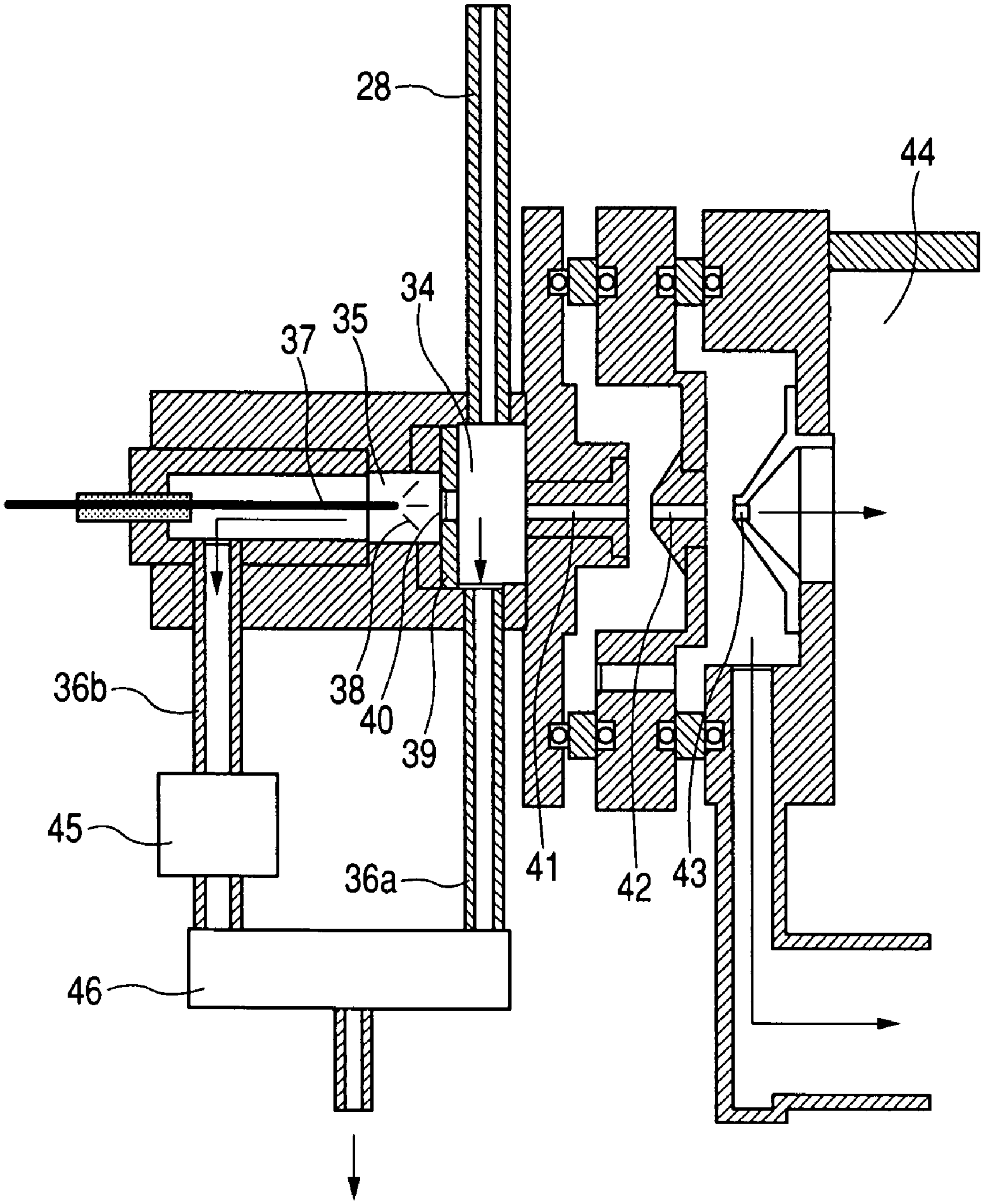
FIG. 2 is a figure showing the ion source section of the chemical agent detector.

FIG. 2 shows the ion source section of the chemical agent detector which utilizes the technique of atmospheric pressure chemical ionization mass spectrometry. A gas introduced through the introduction pipeline 28 is once introduced into an ion drift section 34. This ion drift section 34 is in an approximately atmospheric pressure condition. A part of the gas introduced into the ion drift section 34 is introduced into a corona discharge section 35 and the remainder is discharged out of the ion source via an exhaust pipeline 36*a*. The gas introduced into the corona discharge section 35 is introduced into a corona discharge region 38 formed in the vicinity of the extreme end of a needle electrode 37 by application of a high voltage to the needle electrode 37 and is ionized. On that occasion, a gas is introduced into the corona discharge region 38 in the direction approximately opposing the current of drifting ions from the needle electrode toward a counter electrode 39.

The ions formed are introduced into the ion drift section 34 through the opening 40 of a counter electrode 39 under the influence of an electric field. On this occasion, it is possible to drift the ions and efficiently introduce them into a first narrow orifice 41. The ions introduced from the first narrow orifice 41 are introduced into a vacuum section 44 through a second narrow office 42 and a third narrow orifice 43. The flow rate control of the gas flowing into the corona discharge section 35 is important for high-sensitivity and stable detection. For this purpose, a flow rate controlling section 45 is preferably provided in an exhaust gas pipeline 36*b*. The ion drift section 34, corona discharge section 35 and introduction pipeline 28, among others, are preferably heated by means of heaters (not shown) or the like from the viewpoint of preventing the sample from being adsorbed thereon. While the rates of flow of the gas passing through the introduction pipeline 28 and exhaust pipeline 36*a* can be determined by the capacity of a suction pump 46, for example a diaphragm pump, and the pipeline conductance, it is also possible to provide a control device such as a flow rate controller 45 in the introduction pipeline 28 and/or exhaust pipeline 36*a*. By providing the suction pump 46 downstream from the ion formation section (namely the corona discharge section 35 in the constitution illustrated) in the direction of gas flow, it becomes possible to reduce the influence of contamination (e.g. adsorption of the sample) of the inside of the suction pump 46 on the measurement.

Figure 3:
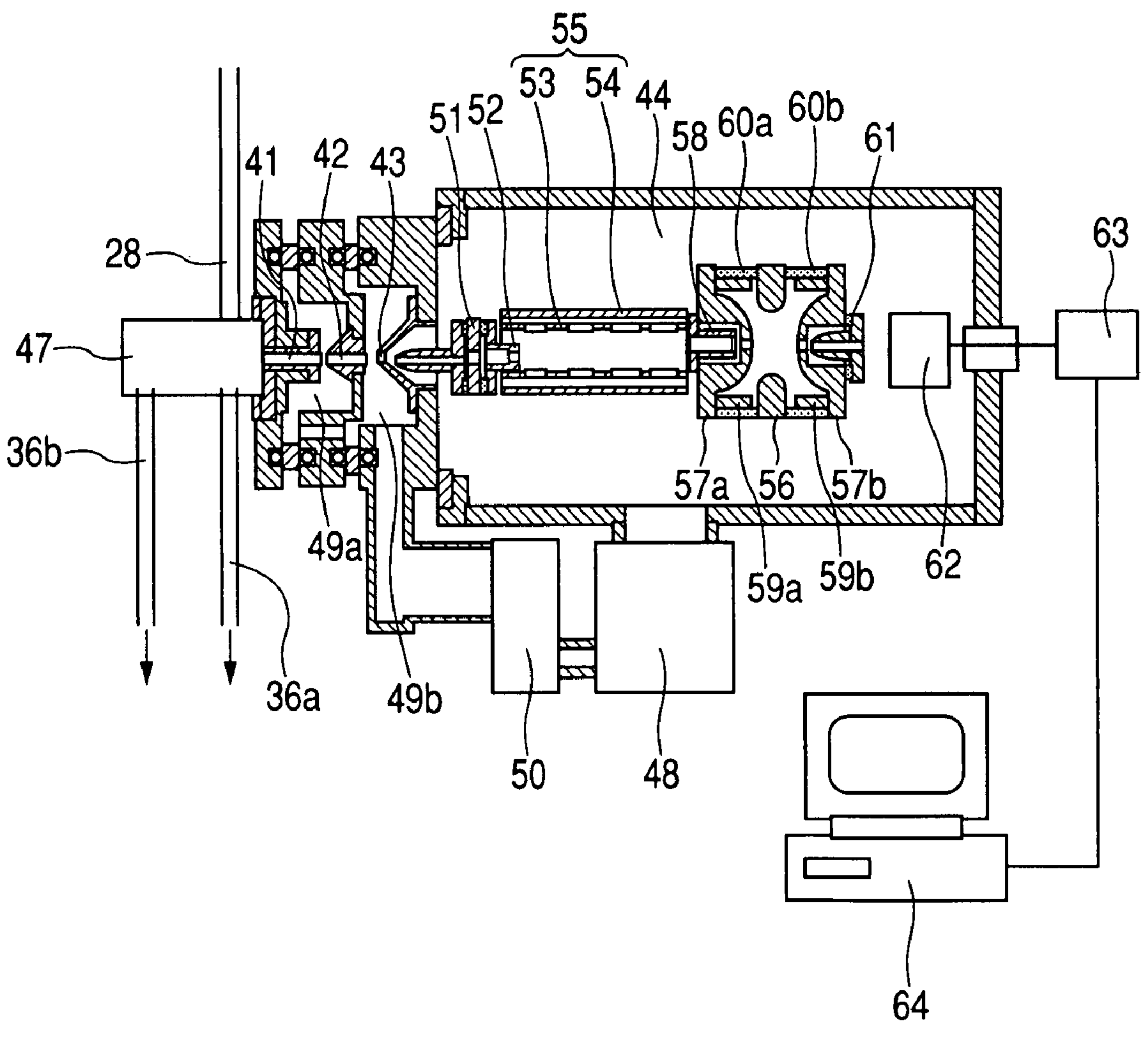
FIG. 3 is a figure showing the mass spectrometry section of the chemical agent detector.

FIG. 3 is a figure showing the apparatus constitution of the mass spectrometry section of the chemical agent detector. It shows an example of the use of a quadrupole ion trap mass spectrometer (hereinafter referred to as "ion trap mass spectrometer") as the mass spectrometer. An ion source 47 having the structure shown in FIG. 2 is connected with an introduction pipeline 28 and exhaust pipelines 36*a* and 36*b*. Components contained in the gas introduced into the ion source are partly ionized. The ions formed by means of the ion source and the gas introduced into the ion source are partly taken into a vacuum section 44 evacuated by a vacuum pump 48 via the first narrow orifice 41, second narrow orifice 42 and third narrow orifice 43. These narrow orifices have a diameter of about 0.3 mm and the electrodes having the narrow orifices are heated to about 100° C.-300° C. by heaters (not shown). The gas portion not introduced into the first narrow orifice is exhausted to the outside via the exhaustion pipes 36*a* and 36*b* by means of a pump.

Among the electrodes respectively having the narrow orifices 41, 42 and 43, there are provided differential exhaustion sections 49*a* and 49*b*, which are exhausted by a roughing vacuum pump 50. Generally used as the roughing vacuum pump 50 is a rotary pump, scroll pump or mechanical booster pump, for instance. A voltage can be applied to the electrodes having the narrow orifices 41, 42 and 43 by a power source (not shown) so that the ion permeability of the differential exhaustion sections 49*a* and 49*b* may be improved and, at the same time, cluster ions formed by adiabatic expansion may be cleaved by collision with remaining molecules. In FIG. 3, a scroll pump with a pumping speed of 900 liters/minute was used as the roughing vacuum pump 50, and a turbo-molecular pump with a pumping speed of 300 liters/second as the vacuum pump 48 for evacuating the vacuum section 44. The roughing vacuum pump 50 also serves as a pump for exhausting the back pressure side of the turbo-molecular pump. The pressure between the second narrow orifice 42 and the third narrow orifice 43 is about 100 pascals. It is also possible to remove the electrode having the second narrow orifice 42 to form a differential exhaustion section constituted of two narrow orifices, namely the first narrow orifice 41 and third narrow orifice 43. In this case, however, the gas inflow increases as compared with the case mentioned above, so that contrivances are required, for example for increasing the pumping speed or/and increasing the distance between the narrow nozzles. In this case, too, it is important to apply a voltage between both the narrow orifices.

The ions formed after passage through the third narrow orifice 43 are converged by a convergent lens 51. An einzel lens consisting of three electrodes, for instance, is generally used as the convergent lens 51. The ions further pass through a slit electrode 52. The structure is such that the ions that have passed through the third narrow orifice 43 are focused on the opening section of the slit electrode 52 by the convergent lens 51 and pass therethrough, while the neutral and other particles not focused collide with this slit portion and hardly enter the mass spectrometer side. The ions that have passed through the slit electrode 52 are deflected and focused by means of a double cylinder type deflector 55 consisting of an inner cylindrical electrode 53 and an outer cylindrical electrode 54 each having a large number of openings. In the double cylinder type deflector 55, the deflection and focusing are realized by utilizing the electric field of the outer cylindrical electrode as spreading from the opening of the inner cylindrical electrode. This is described in detail in JP 07(1995)-85834. The ions that have passed through the double cylinder type deflector 55 are introduced into the ion trap mass spectrometer constituted of a ring electrode 56 and end gap electrodes 57*a* and 57*b*. There is provided a gate electrode 58 for controlling the timing of injection of the ions into the mass spectrometer. Flange electrodes 59*a* and 59*b* are provided for preventing quartz rings 60*a* and 60*b*, which hold the ring electrode 56 and end cap electrodes 57*a* and 57*b*, from being charged by ions arriving at the quartz rings 60*a* and 60*b*. Helium is fed from a helium gas feeding pipe (not shown) to the ion trap mass spectrometer inside and the pressure therein is maintained at about 0.1 pascal. The ion trap mass spectrometer is controlled by a mass spectrometer controlling section (not shown).

The ions introduced into the mass spectrometer collide with the helium gas and lose their energy and are entrapped by an alternating electric field. Upon scanning with a high frequency voltage applied upon the ring electrode 56 and end gap electrodes 57*a* and 57*b*, the ions entrapped are discharged out of the ion trap mass spectrometer according to the m/z values of the ions and, after passage through an ion outlet lens 61, are detected by a detector 62. The signals detected are amplified by an amplifier 63 and then processed in a data processor 64. The ion trap mass spectrometer has a characteristic feature in that it entraps ions within the inside thereof (in a space surrounded by the ring electrode 56 and the end gap electrodes 57*a* and 57*b*), so that even when the concentration of the detection target substance(s) is low and the amount of ions formed is small, the ions can be detected by prolonging the ion introduction time. Therefore, even when the sample concentration is low, ions can be concentrated at a high rate in the ion trap mass spectrometer and thus the sample pretreatment (e.g. concentration) can be very much simplified.

Figure 4:
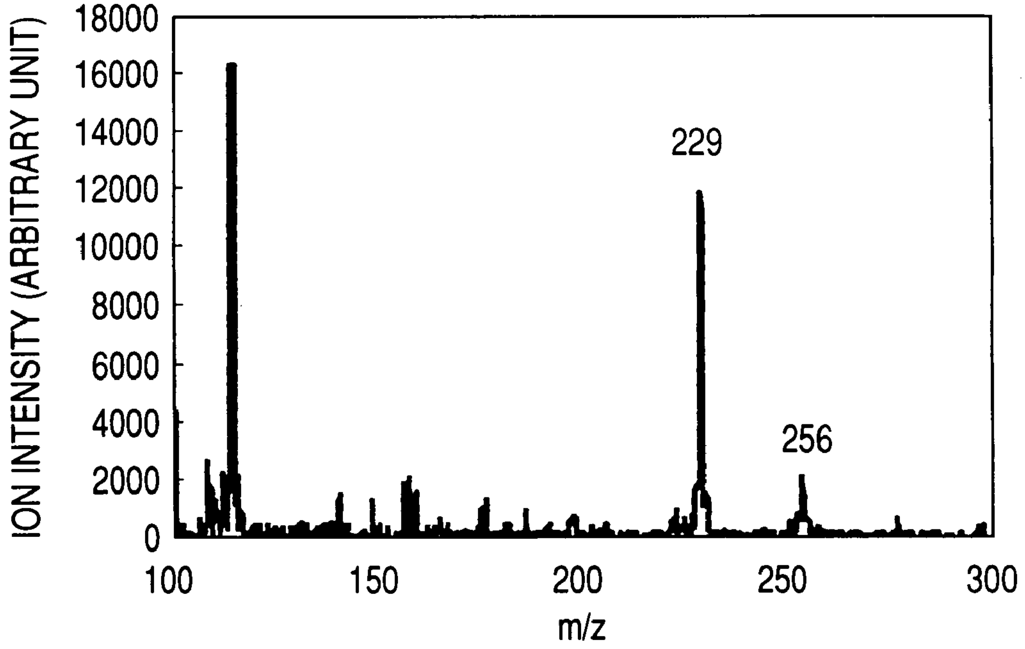
FIG. 4 is a figure showing a mass spectrum of DC.
Figure 5:
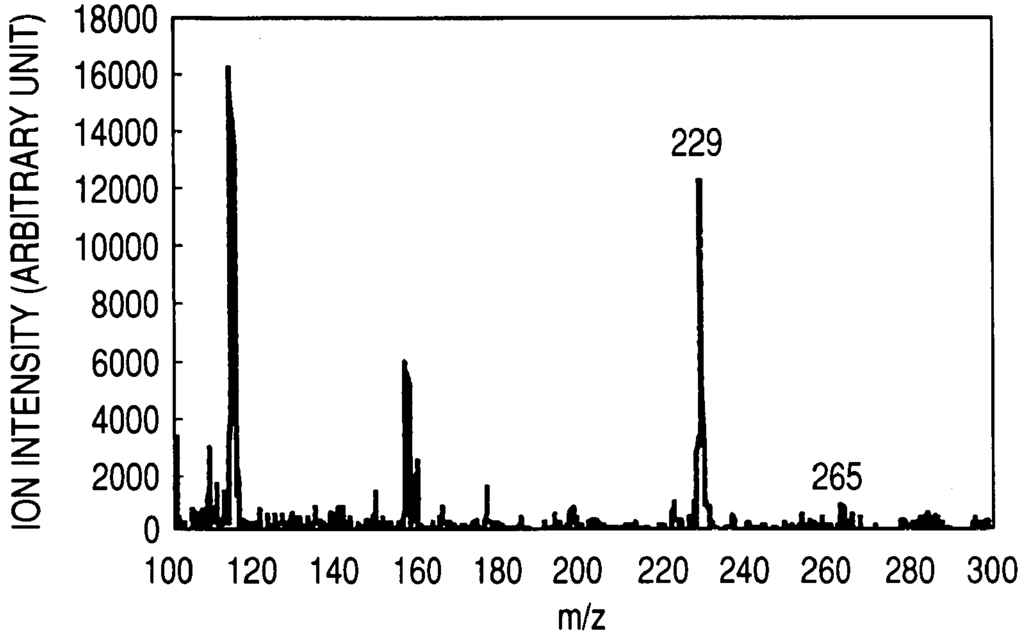
FIG. 5 is a figure showing a mass spectrum of DA.

Now, a mass spectrum of DC as obtained in the chemical agent monitoring apparatus described above referring to FIGS. 1-3 is shown in FIG. 4, and a mass spectrum of DA as obtained in the same manner is shown in FIG. 5. In ionization, the positive ionization mode was used. In this measurement, a hexane solution of DC or DA was injected into the introduction pipeline 28. The size of injection of the reagent was about 20 ng in each case.

In the positive atmospheric pressure chemical ionization mass spectrometry, water vapor is involved in the main ionization processes. First, nitrogen molecules are ionized by corona discharge and the nitrogen molecule ions are immediately ionize water vapor in the atmosphere to form hydronium ions ($H_3O^+$). Many chemical substances are ionized by the chemical reaction with these hydronium ions.

FIG. 4 is first explained. DC is a chemical substance having the following structure:

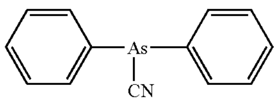

The molecular weight of DC is 255 and the ions observed upon atmospheric pressure chemical ionization are always monovalent and, therefore, the signal observed at m/z=256 is considered to be a pseudomolecular ion resulting from addition of a proton to DC as formed by the reaction:

$$DC+H_3O^+\rightarrow(DC+H)^++H_2O \quad (1)$$

The ion observed at m/z=229 is considered to be a decomposition product ion resulting from elimination of CN from DC as formed by the reaction:

$$DC+H_3O^+\rightarrow(DC-CN)^++HCN+H_2O \quad (2)$$

Now, FIG. 5 is explained. DA is a chemical substance having the following structure

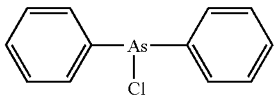

Since DA has a molecular weight of 264, the signal observed at m/z=265 is considered to be a pseudomolecular ion resulting from addition of a proton to DA as formed by the reaction:

$$DA+H_3O^+\rightarrow(DA+H)^++H_2O \quad (3)$$

The ion observed at m/z=229 is considered to be a decomposition product ion resulting from elimination of Cl from DA as formed by the reaction:

$$DA+H_3O^+\rightarrow(DC-Cl)^++HCl+H_2O \quad (4)$$

Upon injection of the sample solutions, the signals shown in FIG. 4 and FIG. 5 were obtained instantaneously (within 1 second) and thus it was found that the DC and DA gases can be instantaneously detected upon arrival thereof at the ion source when the technique of atmospheric pressure chemical ionization mass spectrometry is used in the positive ionization mode. In particular, the decomposition product ion at m/z=229 shows a high intensity, and this experiment revealed for the first time that DC and DA can be measured very speedily and with good sensitivity by measuring this signal. Any complicated procedure as in the prior art technologies is not required and, even when signals are accumulated for increasing the reliability, the results can be obtained in several seconds following gas suction and, therefore, in case of leakage of DC and/or DA, it is now possible to issue a warning promptly.

For determining the individual concentrations of DC and DA, it is enough to measure the respective specific signals, namely the m/z=256 and m/z=265 signals. As is evident from FIG. 4 and FIG. 5, the m/z=256 and m/z=265 signals are weak and, therefore, tandem mass spectrometry is effective in determining the individual concentrations of DC and DA at very low levels. Tandem mass spectrometry is well known in the field of analysis and the description of the technique thereof is omitted. It can reduce chemical noises appearing on the mass spectrum and makes it possible to detect weak signals as well. In an experiment, when tandem mass spectrometry was carried out with the DC-derived m/z=256 ion as a precursor ion, the dissociation of m/z=256→229 was observed. This is considered to be the result of occurrence of the reaction:

$$(DC+H)^+\rightarrow(DC-CN)^++HCN \quad (5).$$

Then, when tandem mass spectrometry was carried out with the DA-derived m/z=265 ion as a precursor ion, the dissociation of m/z=265→229 was observed. This is considered to be the result of occurrence of the reaction:

$$(DA+H)^+\rightarrow(DA-Cl)^++HCl \quad (6).$$

Figure 6:
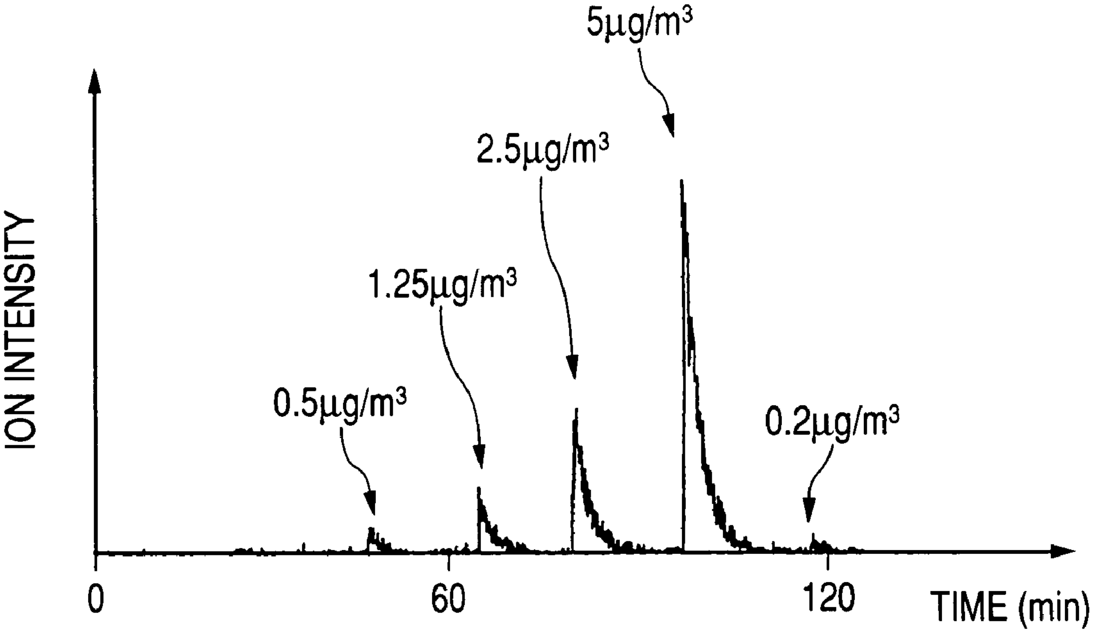
FIG. 6 is a figure showing the signals detected in tandem mass spectrometry of DC.
Figure 7:
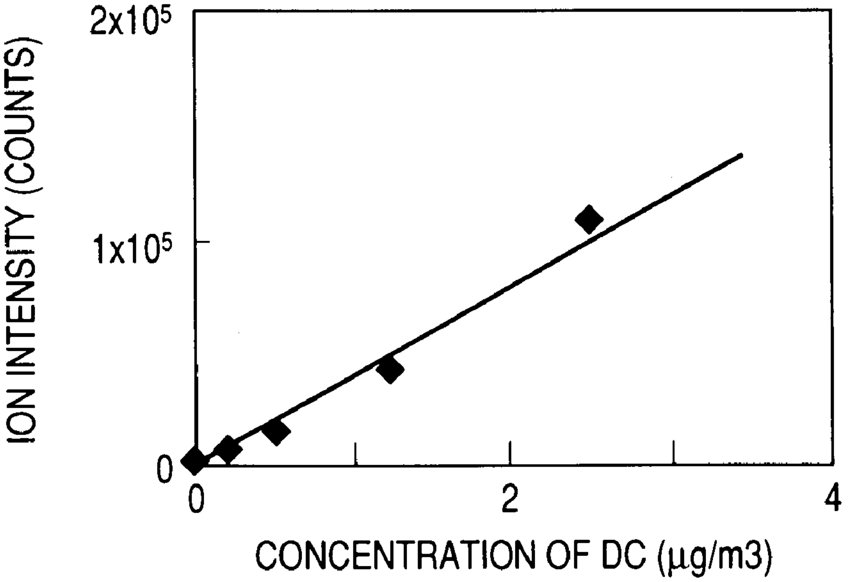
FIG. 7 is a figure showing a calibration curve for DA in tandem mass spectrometry.

Now, the results of an investigation concerning the lower DC detection limit in m/z=256→229 tandem mass spectrometry using the apparatus disclosed herein are described. In this experiment, a 10-liter stainless steel container was used. A hexane solution containing DC dissolved therein was poured into the stainless container and a desired concentration of DC gas was generated by allowing evaporation, the container was then connected with the apparatus and the DC-due ion intensity was measured. FIG. 6 shows the ion intensities as found upon sucking the gas in various concentrations shown in the figure into the apparatus. After connection of the container, the gas in the container was diluted with the air drawn into the container from the outside and the gas concentration decreased and, as a result, the signal intensity decreased gradually. In view of the gas concentration changing during measurement in that manner, signals obtained during about 1 minute after connection of the container were averaged to give ion intensities at respective concentrations, which were used to construct a calibration curve (working curve). The calibration curve for DC is shown in FIG. 7. The results shown in FIG. 7 indicate that the sensitivity (gradient of the calibration curve) of the apparatus disclosed herein is 34000 counts/(μg/m$^3$). On the other hand, when DC-free air was sucked in, the fluctuation in background signal (standard deviation σ) as determined by 100 measurements was 340 counts and, therefore, the lower detection limit for DC, when defined as 3σ, was about 0.03 μg/m$^3$.

In the above experiment, the time required for each measurement was about 2 seconds. Therefore, once an alarm threshold value is determined by obtaining data for the air at the site of measurement and determining the standard deviation σ of the background, it is possible to immediately detect DC in case of leakage thereof and give an alarm. Since the DC concentration can be easily determined from the calibration curve and signal intensity, it is possible to measure the DC concentration, even when it is very low, almost on the real time basis in accordance with the present invention.

Then, the lower detection limit for DA in tandem mass spectrometry based on the m/z=265→229 dissociation was determined in the same manner as in the above-mentioned case of DC and was found to be about 1 μg/m$^3$. This is because DA is more readily decomposed as compared with DC. As is evident from comparison between FIG. 4 and FIG. 5, the m/z=265 ion intensity specific to DA is weaker than the m/z=256 ion intensity specific to DC. Therefore, in the case of DA, the m/z=265→229 ion intensity after tandem mass spectrometry is also weaker as compared with the m/z=256→229 signal in the case of DC. Accordingly, the measurement of DA at very low concentrations becomes more difficult.

As described above, it was found, as a result of the experiments, that, in determining the DA concentration at a very low level, namely 1 μg/$m^3$ or lower, on the real time basis, it is recommendable to calculate the total concentration of DC and DA based on a signal (e.g. m/z=229) common to DC and DA, calculate the DC concentration from the m/z=256→229 signal specific to DC and calculate the DA concentration as the difference between both.

Figure 8:
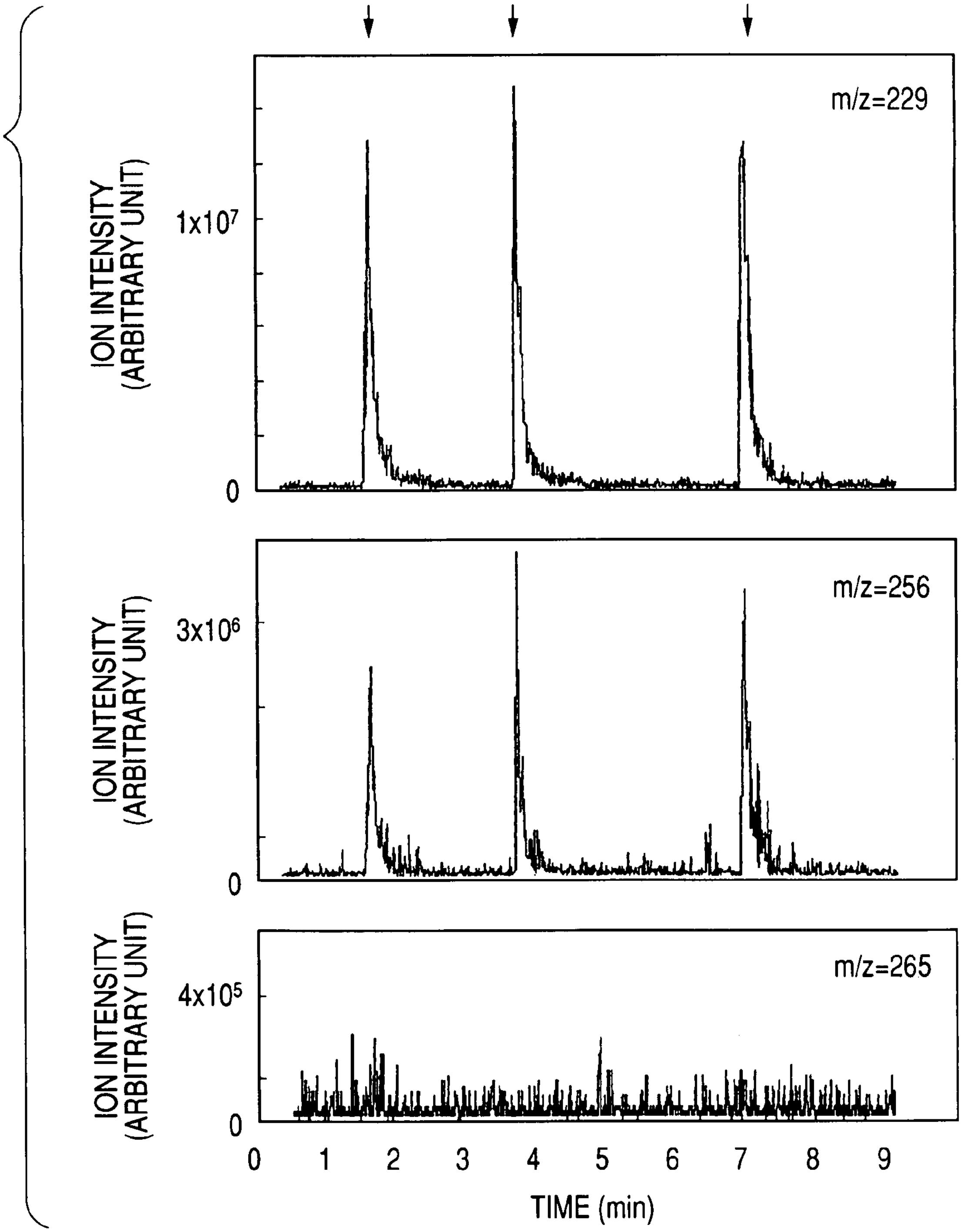
FIG. 8 is a figure showing the signals detected in mass spectrometry of DC.
Figure 9:
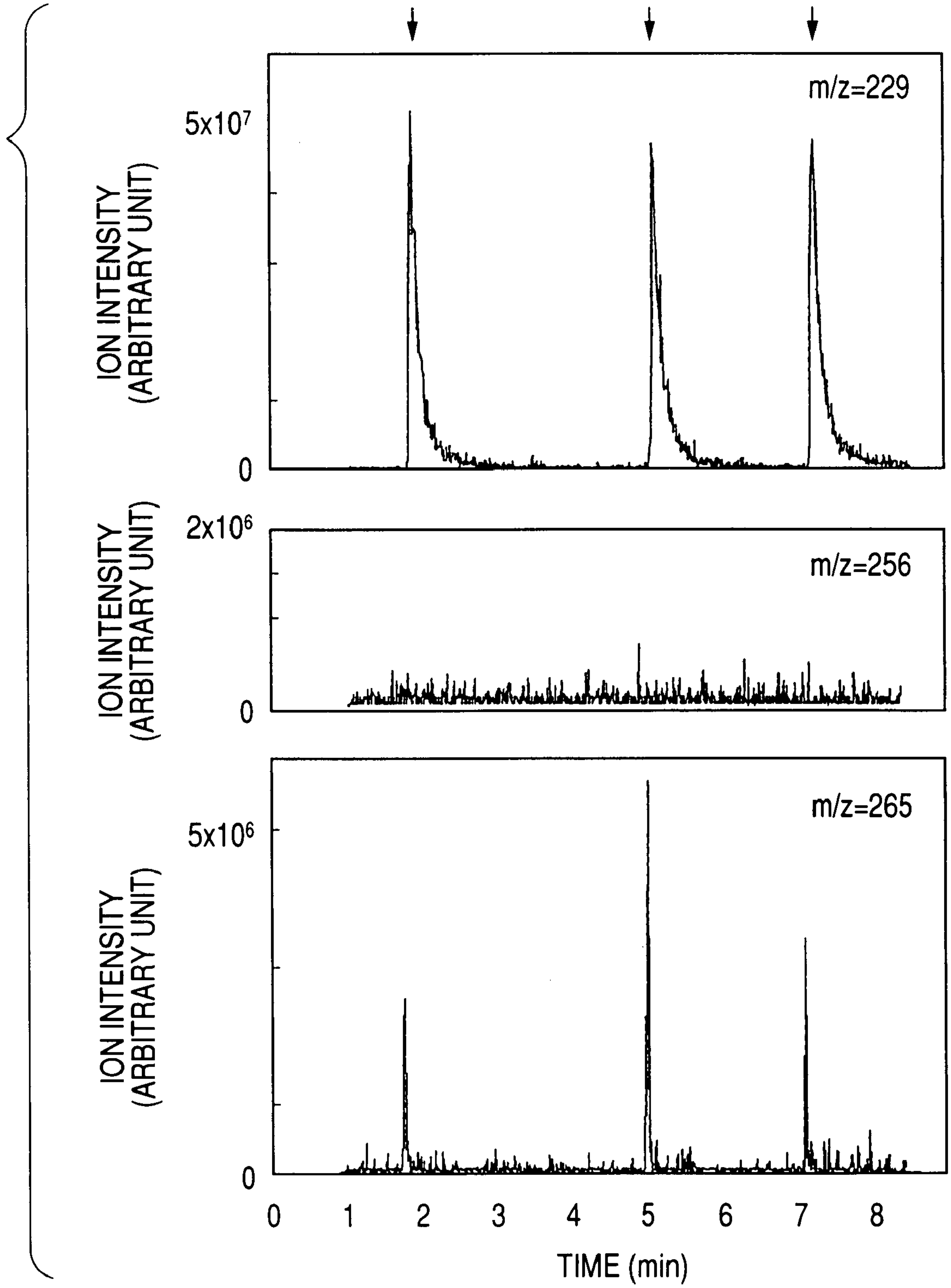
FIG. 9 is a figure showing the signals detected in mass spectrometry of DA.
Figure 10:
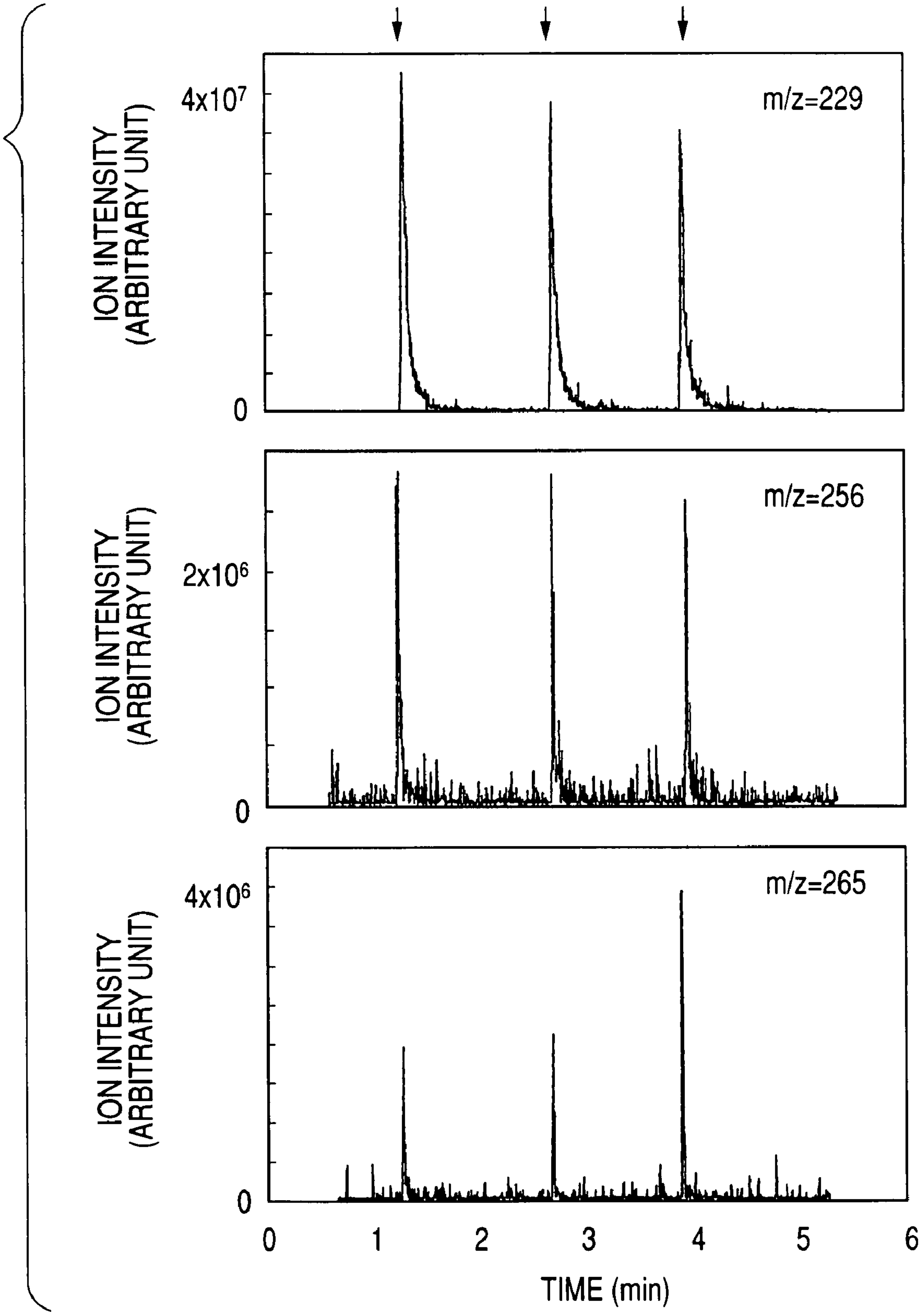
FIG. 10 is a figure showing the signals detected in mass spectrometry of a mixed sample containing DC and DA.

For confirmation, the results of comparison of the m/z=229, 256 and 265 signal intensities obtained from DA and DC are shown in FIGS. 8-10. Like in the cases of FIG. 4 and FIG. 5, each sample solution was injected into the introduction pipeline 28. In FIGS. 8-10, each arrow indicates the timing of sample solution injection. In this measurement, the narrow orifice-forming electrodes and pipelines were maintained at a temperature of 120° C. and the corona discharge current was set at 10 microamperes.

First, FIG. 8 shows the results of measurement of DC. Sample-due signals were detected at m/z=229 and 256 but no signal was detected at 265. The area ratio between the m/z=229 and 256 signals was calculated to be 5:1. FIG. 9 shows the results of measurement of DA. Sample-due signals were detected at m/z=229 and 265 but no signal was detected at 256. The area ratio between the m/z=229 and 265 signals was calculated to be 50:1.

Since the m/z=229 signal is due to a decomposition product, the intensity ratio between m/z=229 and 256 or 265 varies when the measurement conditions, for example the temperature of the narrow orifice-forming electrodes or/and the discharge current in the corona discharge section, are changed. However, when repeated evaluations were made using one and the same apparatus under standardized measurement conditions, the intensity ratio was almost constant.

Then, a solution of a mixture of DC and DA was prepared and injected into the introduction pipeline 28. The results obtained are shown in FIG. 10. Signals were observed at all of m/z=229, 256 and 265, and the area ratio among these signals was calculated to be 59:1.6:1. When the intensity of the m/z=256 signal specific to DC alone was multiplied by 5 and the intensity of the m/z=265 signal specific to DA alone was multiplied by 50, the sum of the both products was almost in agreement with the m/z=229 intensity observed. From the results shown in FIG. 10, it was confirmed that the m/z=229 intensity for a sample containing DC and DA in admixture is represented as the sum of the contribution of DC and the contribution of DA.

After all, at very low DA concentrations, it becomes difficult to detect the m/z=265 signal specific to DA. However, when the intensity ratios among the m/z=229, 256 and 265 signals are measured in advance using DC and DA and are used to create a database according to the apparatus and experimental conditions, the concentration of DA can be estimated from the intensities of the m/z=229 signal common to DC and DA and the m/z=256 signal specific to DC even if the m/z=265 signal cannot be obtained.

Figure 14:
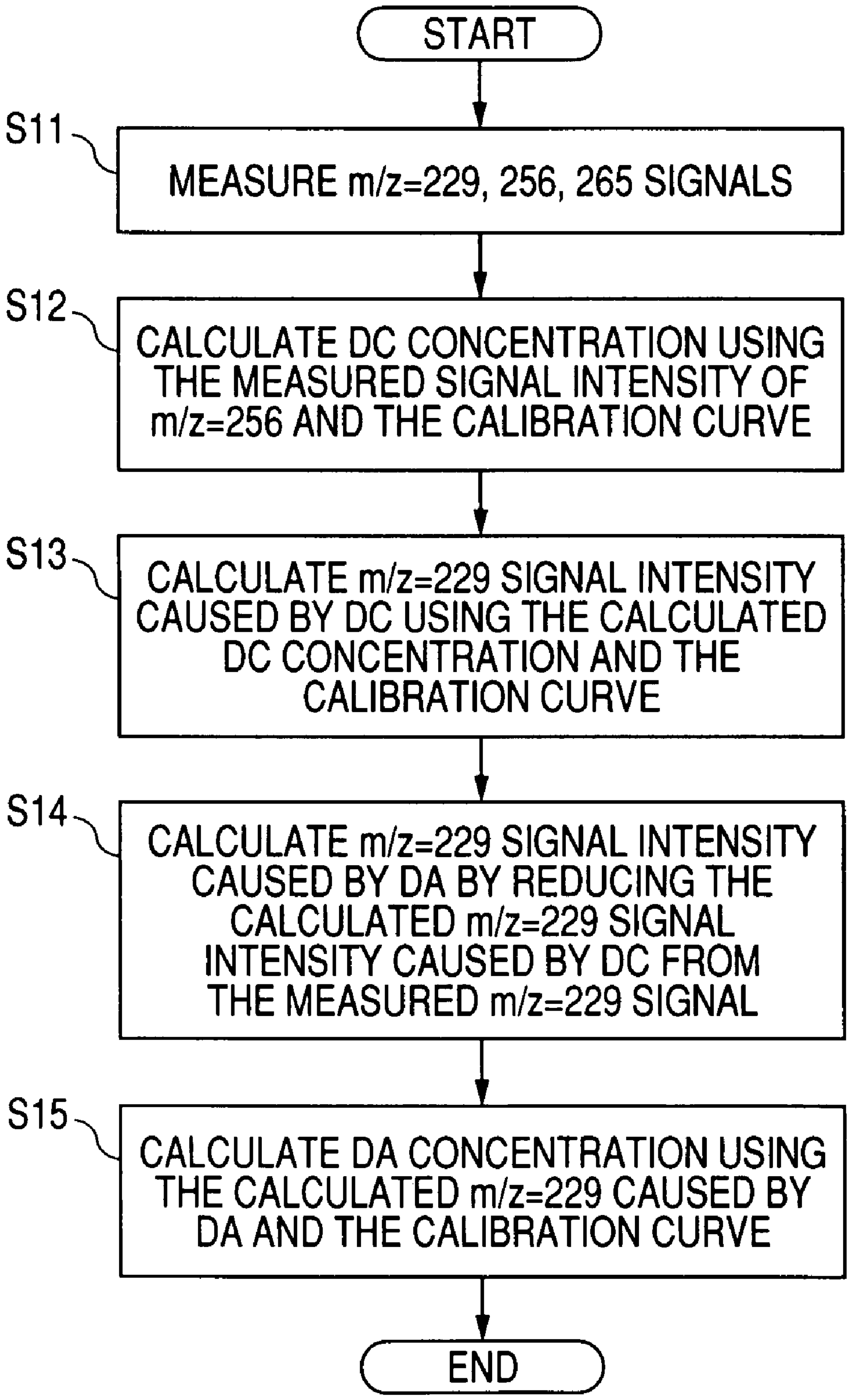
FIG. 14 is a figure showing a flowchart for determining the required concentrations.

A flow for estimating the DA concentration is shown in FIG. 14. First, a sample gas is subjected to mass analysis by atmospheric pressure chemical ionization mass spectrometry and the m/z=229, 256 and 265 signal intensities are measured (S11) Then, the DC concentration is calculated using the m/z=256 signal and a calibration curve (S12). Then, based on that DC concentration, the m/z=229 intensity due to DC is determined (S13). The m/z=229 signal intensity due to DA is calculated by subtracting the contribution of DC from the m/z=229 signal intensity actually measured (S14). Finally, the DA concentration is calculated based on the m/z=229 signal intensity due to DA using a calibration curve (S15).

According to the invention, the concentrations of DC or/and DA at very low levels can be known rapidly and exactly and, therefore, environmental leakage monitoring becomes possible in abandoned chemical weapon treatment or the like and the invention can thus contribute to the safety of workers and nearby residents, among others.

What is claimed is:

1. A gas monitoring apparatus comprising:

a gas introduction section for introducing a sample gas;

an ion source for ionizing a component or components contained in the sample gas;

a mass spectrometer for analyzing the ion or ions formed by the ion source for m/z;

an operation section for calculating the concentration of diphenylcyanoarsine and/or diphenylchloroarsine contained in the sample gas based on the ion intensity data obtained by the mass spectrometer; and a display section for displaying the result or results obtained in the operation section, wherein said operation section calculates the sum total concentration of diphenylcyanoarsine and diphenylchloroarsine from a signal common to diphenylcyanoarsine and diphenylchloroarsine as obtained in said mass spectrometer, calculates the concentration of diphenylcyanoarsine from a signal specific to diphenylcyanoarsine and calculates the concentration of diphenylchloroarsine from the difference between said sum total concentration and said concentration of diphenylcyanoarsine.

2. The gas monitoring apparatus according to claim 1, wherein said signal common to diphenylcyanoarsine and diphenylchloroarsine is the m/z=229 ion intensity signal and said signal specific to diphenylcyanoarsine is the m/z=256 ion intensity signal.

3. The gas monitoring apparatus according to claim 2, comprising a storage section for storing the information concerning the sensitivity to diphenylcyanoarsine and to diphenylchloroarsine at the m/z=229 ion intensity signal, and the sensitivity to diphenylcyanoarsine at the m/z=256 ion intensity signal.

4. A gas monitoring method, comprising the steps of:

subjecting a sample gas to mass analysis and measuring a signal common to diphenylcyanoarsine and diphenylchloroarsine and a signal specific to diphenylcyanoarsine;

calculating the diphenylcyanoarsine concentration based on said signal specific to diphenylcyanoarsine;

determining the diphenylcyanoarsine-due intensity out of the intensity of said signal common to diphenylcyanoarsine and diphenylchloroarsine based on the diphenylcyanoarsine concentration calculated in the above step;

calculating the diphenylchloroarsine-due signal intensity by subtracting said diphenylcyanoarsine-due intensity from the intensity of said signal common to diphenylcyanoarsine and diphenylchloroarsine as measured; and calculating the diphenylchloroarsine concentration based on said diphenylchloroarsine-due signal intensity out of the intensity of the signal common to diphenylcyanoarsine and diphenylchloroarsine as measured.

5. The gas monitoring method according to claim 4, wherein said signal common to diphenylcyanoarsine and diphenylchloroarsine is the m/z=229 ion intensity signal and said signal specific to diphenylcyanoarsine is the m/z=256 ion intensity signal.

6. A gas monitoring apparatus comprising:

a gas introduction section for introducing a sample gas;

an ion source for ionizing a component or components contained in the sample gas;

a mass spectrometer for measuring a signal common to diphenylcyanoarsine and diphenylchloroarsine and a signal specific to diphenylcyanoarsine;

an operation section for:

calculating the concentration of diphenylcyanoarsine based on said signal intensity specific to diphenylcyanoarsine;

determining the diphenylcyanoarsine-due signal intensity out of the intensity of said signal common to diphenylchloroarsine and diphenylcyanoarsine based on the said diphenylcyanoarsine concentration;

calculating the diphenylchloroarsine-due signal intensity by subtracting said diphenylchloroarsine-due intensity from the intensity of said signal common to diphenylchloroarsine and diphenylcyanoarsine as measured; and calculating the diphenylchloroarsine concentration based on said diphenylchloroarsine-due signal intensity out of the intensity of the signal common to diphenylchloroarsine and diphenylcyanoarsine as measured.

7. A gas monitoring method, comprising the steps of:

subjecting a sample gas to mass analysis and measuring a signal common to diphenylcyanoarsine and diphenylchloroarsine and a signal specific to diphenylcyanoarsine;

calculating the sum total concentration of diphenylchloroarsine and diphenylcyanoarsine from said signal intensity common to diphenylchloroarsine and diphenylcyanoarsine as measured;

calculating the concentration of diphenylcyanoarsine from said signal intensity specific to diphenylcyanoarsine; and calculating the concentration of diphenylchloroarsine from the difference between said sum total concentration and said concentration of diphenylcyanoarsine.

* * * * *